United States Patent
Bansal

(10) Patent No.: US 9,706,404 B2
(45) Date of Patent: Jul. 11, 2017

(54) OUT OF BAND AUTHENTICATION WITH USER DEVICE

(71) Applicant: VISA INTERNATIONAL SERVICE ASSOCIATION, San Francisco, CA (US)

(72) Inventor: Parveen Bansal, San Ramon, CA (US)

(73) Assignee: VISA INTERNATIONAL SERVICE ASSOCIATION, San Francisco, CA (US)

(*) Notice: Subject to any disclaimer, the term of this patent is extended or adjusted under 35 U.S.C. 154(b) by 0 days.

(21) Appl. No.: 15/091,502

(22) Filed: Apr. 5, 2016

(65) Prior Publication Data

US 2016/0302065 A1    Oct. 13, 2016

Related U.S. Application Data

(60) Provisional application No. 62/144,106, filed on Apr. 7, 2015.

(51) Int. Cl.
| | |
|---|---|
| *H04W 12/06* | (2009.01) |
| *H04W 4/02* | (2009.01) |
| *H04L 29/06* | (2006.01) |

(52) U.S. Cl.
CPC ............. *H04W 12/06* (2013.01); *H04L 63/18* (2013.01); *H04W 4/021* (2013.01)

(58) Field of Classification Search
CPC ...................................................... H04W 12/06
See application file for complete search history.

(56) References Cited

U.S. PATENT DOCUMENTS

| 9,268,920 | B1* | 2/2016 | Butler ................... G06F 21/10 |
| 2003/0061518 | A1* | 3/2003 | Yamaguchi ............. H04L 9/083 |
| | | | 726/6 |
| 2009/0249475 | A1 | 10/2009 | Ohaka |
| 2010/0218249 | A1 | 8/2010 | Wilson et al. |
| 2013/0328671 | A1 | 12/2013 | McKown et al. |
| 2014/0087696 | A1 | 3/2014 | Gressus et al. |
| 2014/0331313 | A1 | 11/2014 | Kim et al. |

* cited by examiner

*Primary Examiner* — Michael T Vu
(74) *Attorney, Agent, or Firm* — Kilpatrick Townsend & Stockton LLP

(57) ABSTRACT

A user utilizing a first user device can request to be authenticated to a web site. The first user device may send an authentication request to the server operating the web site. The server may then send a first signal to a second user device associated with the user. A second signal can be generated based on reading the first signal. The second user device may send the second signal to the server. The server can compare the first signal and second signal and may authenticate the user if the signals match.

17 Claims, 4 Drawing Sheets

OUT OF BAND AUTHENTICATION WITH USER DEVICE

CROSS-REFERENCES TO RELATED APPLICATIONS

This application is a non-provisional of and claims the benefit of the filing date of U.S. Provisional Patent Application No. 62/144,106, filed on Apr. 7, 2015, the disclosure of which is herein incorporated by reference in its entirety for all purposes.

BACKGROUND

Authentication processes often include one or more steps of authentication that can be utilized to increase security. In some cases, the steps may comprise different types of authentication. However, it can be cumbersome if increased security is compromised by the need for more user input.

Embodiments of the invention address this and other problems, individually and collectively.

SUMMARY

Embodiments of the present invention relate to systems and methods for conducting an out-of-band authentication process that utilizes minimal user input. For example, a server computer can receive an authentication request from a first user device associated with a user and can send a first signal to a second user device associated with the user. The server computer can subsequently receive a second signal from the second user device, wherein the second signal is generated based on reading the first signal. The server computer can determine whether the second signal is valid based on the first signal and if so, the server computer may authenticate the user. User input is minimized by utilizing a signal that is generated and transmitted by the second user device as the user is unaware and does not need to provide any further input for authorization purposes.

Some embodiments of the invention are directed to a method including receiving, by a server computer, an authentication request from a first user device associated with a user. The method may further include transmitting, by the server computer, a first signal to a second user device associated with the user. The server computer may receive a second signal from the second user device where the second signal is generated based on the second user device reading the first signal. The method may include determining, by the server computer, that the second signal is valid based on the transmitted first signal. The method may also include authenticating, by the server computer, the user based on the determination that the second signal is valid.

In some embodiments, the first signal can be data representing a vibration pattern. In some embodiments, the second user device generates the vibration pattern using a motor, and detects the first signal by one or more of an accelerometer and a microphone.

In some embodiments, the method may also include transmitting, by the server computer, a request for a password to the first user device associated with the user. The server computer may receive input from the first user device that includes the requested password.

In some embodiments, authentication of the user is further based on the input from the first user device.

In some embodiments, the method may also include maintaining, by the server computer, enrollment information that identifies the second user device associated with the user for use in authenticating the user.

In some embodiments, authenticating the user is further based on validating the second user device utilizing the enrollment information.

In some embodiments, the method may also include maintaining, by the server computer, network information that identifies a home area network associated with the user for use in authenticating the user.

In some embodiments, the second signal is generated based on the second user device reading the first signal and identifying that the second user device is connected to the home area network associated with the user.

In some embodiments, the method may also include appending an identifier for the home area network to the second signal after generation of the second signal by the second user device.

In some embodiments, authenticating the user is further based on the identifier for the home area network and the network information associated with the user.

In some embodiments, the method may also include maintaining, by the server computer, geo-fence information associated with the user. The geo-fence information may be associated with the user during an enrollment process.

In some embodiments, the second signal is generated based on the second user device reading the first signal and identifying that a location of the second user device is within a geo-fence identified by the geo-fence information associated with the user.

In some embodiments, authenticating the user is further based on the geo-fence information associated with the user.

In some embodiments, the method may also include maintaining threshold information that identifies a certain threshold associated with authenticating the user utilizing the second signal.

In some embodiments, authenticating the user is further based on a comparison of the first signal and the second signal exceeding a particular threshold identified by the threshold information.

Embodiments of the invention are further directed to a server computer comprising a processor and a memory element. The memory element can comprise code, executable by the processor, for implementing any of the methods described herein.

Embodiments of the invention are further directed to a user device comprising a processor and a memory element. The memory element can comprise code, executable by the processor, for implementing any of the methods described herein.

These and other embodiments of the invention are described in further detail below.

DETAILED DESCRIPTION

Figure 1:
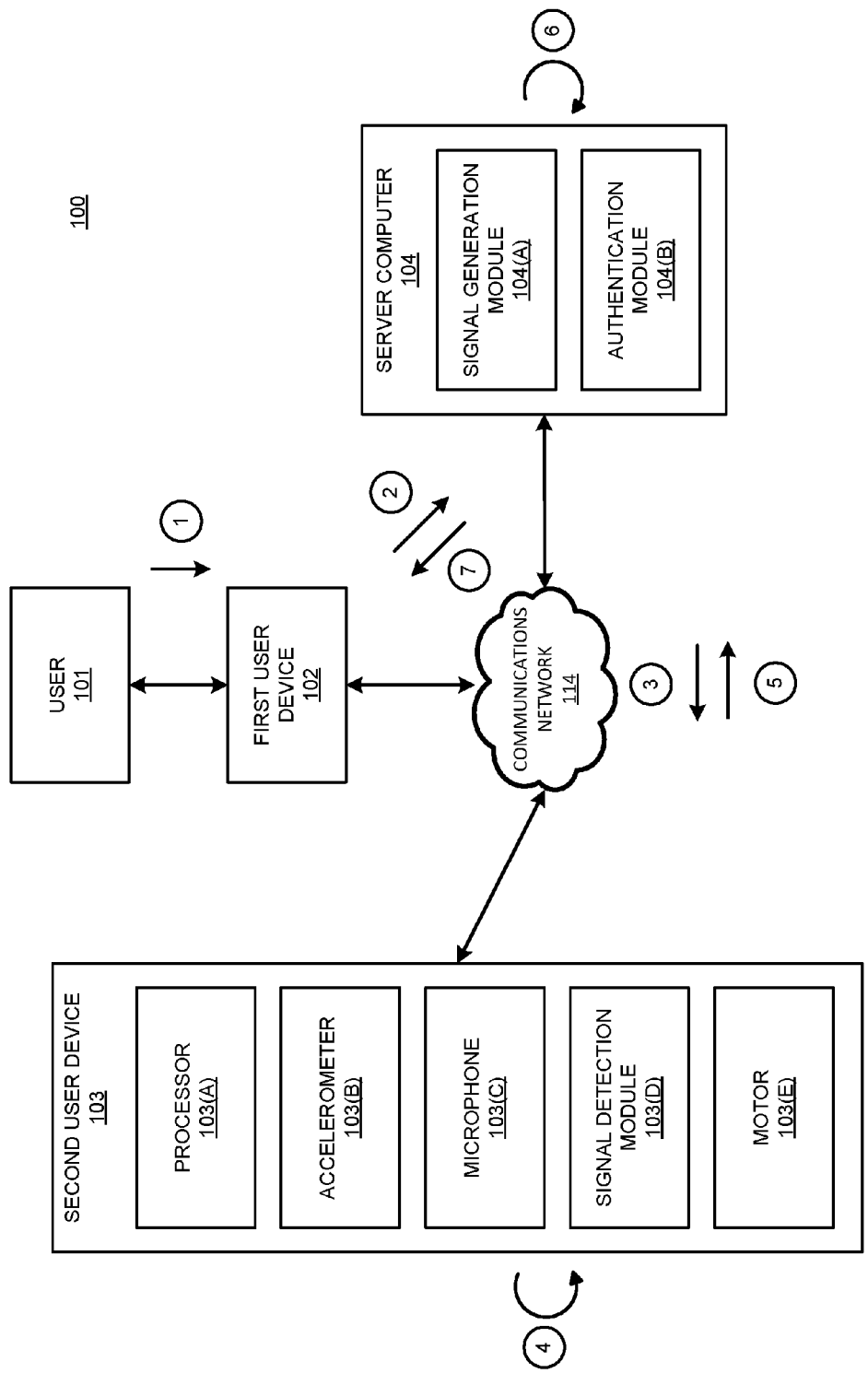
FIG. 1 shows a block diagram of a system and a process flow according to embodiments of the present invention.

Authentication processes often comprise multiple factors of authentication. However, increased security is usually compromised by increased user input, which can be cumbersome. The present invention provides systems and methods that allow an authentication process to be conducted with minimal user input. A server computer can receive an authentication request from a first user device associated with a user. The server computer can send a first signal to a second user device associated with the user. Subsequently, the server computer can receive a second signal from the second user device, wherein the second signal is generated based on reading the first signal. The server computer can then determine whether the first signal and the second signal match and if so, authenticate the user.

A user can provide information about themselves, devices (such as the second user device), home area networks, or other suitable information during an enrollment process implemented by an authentication service. The authentication service may implement the embodiments described herein. In some embodiments, a service provider computer or server computer may implement and maintain information provided during an enrollment process. Information provided during the enrollment process can utilize two-step authentication embodiments described herein. For example, a user may provide information about the home area network that the first user device and second user device will use to communicate authentication requests. Thereafter, a server computer may compare the first signal to the second signal and the received home area network information to the home area network information provided during the enrollment process to validate the authentication request.

Embodiments of the invention may provide a number of advantages. As described above, authentication according to embodiments of the invention can increase security without increasing user input. This can allow for less interaction between a user and device and thus minimize human input error. This can also eliminate the need to implement pages on a webpage or mobile application prompting the user for information multiple times. Additionally, some embodiments of the invention utilize different types of communications, such as by a communications network and by audio or tactile feedback. This can ensure increased security as it is more difficult for information communicated by multiple modes of communication to be compromised. Further, this invention provides flexibility as it can be implemented with any type of signal (e.g., tactile, audio, electric, etc.) that can be output by a suitable output device and read by an input device, as well as be combined with additional authentication processes without significant system changes.

Prior to discussing specific embodiments of the invention, some terms may be described in detail.

A "user" may include an individual. In some embodiments, a user may be associated with a first user device and/or a second user device. The user may be associated with one or more personal accounts. The user may also be referred to as a cardholder, account holder, or consumer.

A "first user device" and "second user device" may include any suitable electronic device that may, or may not, be transported and operated by a user, which may also provide remote communication capabilities to a network. The first user device and second user device may be referred to as user devices. Examples of remote communication capabilities include using a mobile phone (wireless) network, wireless data network (e.g. 3G, 4G or similar networks), Wi-Fi, Wi-Max, or any other communication medium that may provide access to a network such as the Internet or a private network. Examples of user devices include mobile phones (e.g. cellular phones), PDAs, tablet computers, net books, laptop computers, personal music players, hand-held specialized readers, etc. Further examples of user devices include wearable devices, such as smart watches, fitness bands, ankle bracelets, rings, earrings, etc., as well as automobiles with remote communication capabilities. In embodiments of the invention, first and second user devices may include their own respective housings, data processors, and memories.

A "server computer" may include a powerful computer or cluster of computers. For example, the server computer can be a large mainframe, a minicomputer cluster, or a group of servers functioning as a unit. In one example, the server computer may be a database server coupled to a Web server. The server computer may comprise one or more computational apparatuses and may use any of a variety of computing structures, arrangements, and compilations for servicing the requests from one or more user devices.

A "payment device" may include any suitable device that may be used to conduct a financial transaction, such as to provide payment credentials to a merchant. The payment device may be a software object, a hardware object, or a physical object. As examples of physical objects, the payment device may comprise a substrate such as a paper or plastic card, and information that is printed, embossed, encoded, or otherwise included at or near a surface of an object. A hardware object can relate to circuitry (e.g., permanent voltage values), and a software object can relate to non-permanent data stored on a device. A payment device may be associated with a value such as a monetary value, a discount, or store credit, and a payment device may be associated with an entity such as a bank, a merchant, a payment processing network, or a person. A payment device may be used to make a payment transaction. Suitable payment devices can be hand-held and compact so that they can fit into a user's wallet and/or pocket (e.g., pocket-sized). Example payment devices may include smart cards, magnetic stripe cards, keychain devices (such as the Speedpass™ commercially available from Exxon-Mobil Corp.), etc. Other examples of mobile devices include pagers, payment cards, security cards, access cards, smart media, transponders, and the like. If the payment device is in the form of a debit, credit, or smartcard, the payment device may also optionally have features such as magnetic stripes. Such devices can operate in either a contact or contactless mode. In some embodiments, a mobile device can function as a payment device (e.g., a mobile device can store and be able to transmit payment credentials for a transaction).

An "application" may be computer code or other data stored on a computer readable medium (e.g. memory element or secure element) that may be executable by a processor to complete a task.

An "acquirer" may typically be a business entity (e.g., a commercial bank) that has a business relationship with a particular merchant or other entity. Some entities can perform both issuer and acquirer functions. Some embodiments may encompass such single entity issuer-acquirers. An acquirer may operate an acquirer computer, which can also be generically referred to as a "transport computer."

An "authorizing entity" may be an entity that authorizes a request. Examples of an authorizing entity may be an issuer, a governmental agency, a document repository, an access administrator, etc. An "issuer" may typically refer to a business entity (e.g., a bank) that maintains an account for a user. An issuer may also issue payment credentials stored on a user device, such as a cellular telephone, smart card, tablet, or laptop to the consumer. As described herein, a server computer may authenticate the user or authentication requests may be provided to the authorizing entity for authorization of the user.

A "signal" can be a function that conveys information. In embodiments, the first signal and/or second signal may be "read" by the second user device to perform an action such as vibrating, providing a sound, or other functions. As used herein, the second user device may "read" the first signal and second signal by detecting, interpreting, and/or transforming the signals. For example, a first signal may indicate or instruct the first user device to output a sound that can then be read by the second user device and converted to the second signal for further communication to the server computer.

"Enrollment information" may include suitable information provided by a user during an enrollment process that may be utilized, in some embodiments, during a two-step authentication process. Enrollment information may include home area network information associated with the user, device information (such as device IDs for the first user device and second user device), user identification information such as passwords, pins, or biometric templates, global positioning satellite (GPS) information and geo-fence information associated with the user, etc.

A "home area network" may include any suitable communication network that is deployed and operated within a small boundary for enabling the communication and sharing of resources between computer systems via a network connection. A home area network may be associated with a user and include an identifier. In some embodiments, information identifying a certain home area network that is being utilized by the first user device and second user device may be communicated to the server computer as part of the authentication process.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described. For example, memory elements are present in the first and second user devices 102, 103, and the server computer 104, but are not specifically illustrated for clarity of illustration.

FIG. 1 illustrates an exemplary system 100 with at least some of the components for implementing embodiments of the invention. FIG. 1 includes a user 101, a first user device 102, a second user device 103 (both of which may alternatively be referred as first and second devices, respectively), a server computer 104, and a communications network 114. First user device 102, second user device 103, and server computer 104 can communicate with each other via the communications network 114. Second user device 103 may include a processor 103(A), an accelerometer 103(B), a microphone 103(C), signal detection module 103(D), and motor 103(E). Server computer 104 may include a signal generation module 104(A) and an authentication module 104(B).

A user 101 (which may alternatively be referred to as a consumer) may be associated with one or more user devices and may initiate an authentication request. In some embodiments, user 101 may be operating first user device 102 to access a webpage or mobile application operated by server computer 104. For certain services, server computer 104 may request authentication from user 101. By accessing such services, user 101 may initiate an authentication request to be sent from first user device 102 to server computer 104. User 101 may also be associated with second user device 103 that can be utilized in an authentication process. User 101 may interact with one or more of first user device 102 and second user device 103 during the authentication process. In some cases, user 101 may not enter any user input into any device for authentication.

First user device 102 may be any suitable device that has wireless communication capabilities and may be capable of conducting any methods described herein. First user device 102 may be capable of communicating wirelessly with server computer 104 and other entities by any suitable communications network, such as communications network 114. In some implementations, first user device 102 may be configured to communicate with one or more cellular networks. First user device 102 may be utilized by user 101 to access a web page operated by server computer 104. In some embodiments, first user device 102 may be utilized in an authentication process to authenticate user 101 to server computer 104. First user device 102 may also comprise a memory element comprising information or code for implementing any methods described herein.

Second user device 103 may be any suitable device that has wireless communication capabilities and may be capable of conducting any methods described herein. Second user device 103 may include processor 103(A) and other components coupled to processor 103(A), including accelerometer 103(B), microphone 103(C), signal detection module 103(D), and motor 103(E). Second user device 103 may also comprise a memory element comprising information or code for implementing any methods described herein. Second user device 103 may communicate over communications network 114 with one or more entities, including server computer 104, to authenticate user 101.

Processor 103(A) may include hardware within second user device 103 that carries out instructions embodied as code in a computer-readable medium (e.g., a non-transitory computer-readable medium). An exemplary processor may be a central processing unit (CPU). As used herein, a processor can include a single-core processor, a plurality of single-core processors, a multi-core processor, a plurality of multi-core processors, or any other suitable combination of hardware configured to perform arithmetical, logical, and/or input/output operations of a computing device.

Microphone 103(C) may be any device that can convert audio inputs to an electric signal. In some embodiments, microphone 103(C) may receive sound from one or more sources and communicate them to signal detection module 103(D).

Accelerometer 103(B) may be any device that can measure acceleration forces. Accelerometer 103(B) may be capable of converting vibration inputs to electric signals. In some embodiments, a motor 103(E) may receive a first signal from server computer 104 and cause second user device 103 to vibrate according to a vibration pattern indicated by the first signal. Accelerometer 103(B) may detect the vibrations and generate a second signal that is sent to server computer 104. In some implementations, accelerometer 103(B) may be capable of detecting various types of vibrations (e.g., differing by magnitude, frequency, length, etc.).

Some non-limiting examples of first user device 102 and second user device 103 may include mobile devices (e.g., cellular phones, keychain devices, personal digital assistants (PDAs), pagers, notebooks, laptops, notepads, smart watches, fitness bands, jewelry, etc.), automobiles with remote communication capabilities, personal computers, and the like. The first and second user devices 102, 103, may have the same or different form factor. In some embodiments, second user device 103 is a mobile phone while first user device 102 is a personal computer.

Signal detection module 103(D) may read a first signal and generate a second signal based on the reading. For example, second user device 103 may receive a first signal comprising a vibration pattern causing a motor (103(E)) in the second user device 103 to run, thereby causing the second user device 103 to vibrate. Accelerometer 103(B) may detect and read the vibration pattern to generate a second signal. In some embodiments, signal detection module 103(D) may read the vibration pattern by detecting the sounds associated with the vibration utilizing microphone 103(C). An audio signal received by microphone 103(C) may be converted to an electric signal to generate a second signal.

Server computer 104 may be any suitable computer having wireless communication capabilities and be capable of communicating with a device associated with user 101 to authenticate user 101. In some embodiments, server computer 104 may operate a website or mobile application accessed by user 101 on a device, such as first user device 102. Server computer 104 may comprise signal generation module 104(A) and authentication module 104(B). In embodiments, server computer 104 may be in communication with one or more merchant computers (not shown) for providing content such as media or offering of items. The server computer 104 and one or more merchant computers may communicate as part of a transaction process to authenticate the user utilizing techniques described herein.

Signal generation module 104(A) may be capable of generating a signal that can be sent to and processed by another device. For example, signal generation module 104(A) may generate data representing a vibration pattern that can be sent to second user device 103, causing second user device 103 to vibrate by accelerometer 103(B). In some embodiments, the signal may be of a different form (e.g., a sound pattern playable by a speaker). The generated signal may be detected and read by second user device 103.

Authentication module 104(B) may be capable of determining whether user 101 may be authenticated to server computer 104. Authentication module 104(B) may determine whether a received second signal is valid. In some embodiments, authentication module 104(B) may compare a first signal generated by signal generation module 104(A) and a second signal received from a device, such as second user device 103. If the first signal and second signal match, or if the second signal is one which is expected, then the authentication module 104(B) may determine that user 101 can be authenticated. In other embodiments, the second signal may receive any other information based on the first signal (e.g., number of detected vibrations types). Authentication module 104(B) may determine whether the received information is valid based on information from signal generation module 104(A). As described, authentication may be completed without user input. In some embodiments, authentication module 104(B) may authenticate user 101 if the first signal is detected to an accuracy of a certain threshold (e.g., 90%) set by server computer 104.

Communications network 114 may comprise a plurality of networks for secure communication of data and information between entities. In some embodiments, communications network 114 may follow a suitable communication protocol to generate one or more secure communication channels for first user device 102, second user device 103, and server computer 104. Any suitable communications protocol may be used for generating a communications channel. A communication channel may in some instance comprise a "secure communication channel," which may be established in any known manner, including the use of mutual authentication and a session key and establishment of an SSL session. However, any method of creating a secure channel may be used. By establishing a secure channel, sensitive information related to user 101 may be securely transmitted.

In other embodiments, the signal sent to the second user device 103 may be in the form of an authentication code. The authentication code may be sent from a server computer 104 through a first communication channel (e.g., over the air through the cellular network) to the second user device 103. The second user device 103 may include software which allows the authentication code to be transmitted back to the server computer 104 through a different channel (e.g., a data channel Wi-Fi and the Internet).

A method according to the embodiments of the invention can be described with respect to FIG. 1. FIG. 1 shows a flowchart of a method for conducting an out-of-band authentication according to embodiments of the present invention.

Additional methods and processes may be included within these methods and may be recognized by one of ordinary skill in the art, in light of the description below. Further, in some embodiments of the present invention, the described methods may be combined, mixed, and matched, as one of ordinary skill would recognize.

At step 1, user 101 may operate first user device 102. User 101 may access a website or mobile application operated by server computer 104 on first user device 102. Server computer 104 may request authentication from user 101 before allowing user 101 access a certain service. In some embodiments, first user device 102 may be a personal computer.

At step 2, first user device 102 may send an authentication request to server computer 104. This may cause signal generation module 104(A) to generate a first signal that can be utilized to authenticate user 101. For example, the first signal can include data representing a vibration pattern. The vibration pattern may have any suitable characteristics (e.g., of different volume, length, etc.). In some implementations, the vibrations may indicate certain text (e.g., Morse Code). In some embodiments, the vibration pattern may be specific to user 101 or device associated with user 101. First user device 102 and server computer 104 may communicate by communications network 114.

At step 3, server computer 104 may send the generated first signal to second user device 103. Second user device 103, which may be a mobile phone, may receive the first signal and may vibrate in a manner corresponding to the vibration pattern associated with the first signal. A motor (103(E)) in the second user device 103 may receive the first signal and may cause the second user device to vibrate.

In some embodiments, user 101 may conduct an enrollment process prior to sending the authentication request to server computer 104. For example, user 101 may enroll second user device 103 with server computer 104 to be utilized for an out-of-band authentication as described in embodiments of the invention.

At step 4, signal detection module 103(D) may read the received first signal to generate a second signal. Signal detection module 103(D) may read the first signal in various ways. For example, signal detection module 103(D) may utilize accelerometer 103(B) to read (i.e., detect and interpret) the vibrations of second user device 103 and generate a second signal. In another example, signal detection module 103(D) may utilize microphone 103(C) to read sounds associated with the vibrations of second user device 103 and generate a second signal. In some cases, signal detection module 103(D) may utilize both accelerometer 103(B) and microphone 103(C) to read the received first signal.

In some embodiments, the second signal may not be generated by a direct reading of the first signal. For example, signal detection module 103(D) may detect the number of vibrations or sounds of a certain type (e.g., length, volume, frequency, etc.) from the received vibration pattern. Any other suitable information surrounding the first signal may be requested and detected. This information may be sent along with or instead of a signal generated by directly reading the received vibrations caused by the first signal. In some embodiments, signal generation module 104(A) may store this information when the first signal is generated and may communicate the information to authentication module 104(B) during authentication.

At step 5, second user device 103 may send the generated second signal to server computer 104. Second user device 103 and server computer 104 may communicate by communications network 114.

At step 6, server computer 104 may utilize the received second signal to determine whether user 101 should be authenticated to server computer 104. Authentication module 104(B) may determine whether the second signal received from second user device 103 is valid based on the first signal generated by signal generation module 104(A). In some cases, authentication module 104(B) may compare the first signal and the second signal. If the first signal and second signal match, then server computer 104 may determine that user 101 may be authenticated. In some embodiments, if the second signal includes additional or other information as described in step 4, authentication module 104(B) may determine whether the received information is valid and if so, may authenticate user 101.

At step 7, server computer 104 may send an indication to first user device 102 that user 101 may be authenticated. This may allow user 101 to utilize the service on the web page or the mobile application that user 101 may have attempted to access with first user device 102.

While the embodiment above describes second user device 103 utilized with server computer 104 to authenticate user 101, embodiments are not so limited. For example, first user device 102 may also be utilized in an authentication process. After second user device 103 receives a first signal (e.g., a vibration or sound pattern) from server computer 104, first user device 102 may detect the first signal. First user device 102 may utilize any suitable mechanism to detect the vibration. In some cases, first user device 102 may utilize its microphone to read the sounds associated with the vibrations from second user device 103. In other cases, first user device 102 may utilize a vibration detection mechanism that can read the vibrations from second user device 103 upon contact.

In some embodiments, server computer 104 may conduct a multiple-factor authentication for user 101. In some cases, other authentication methods may be conducted in addition to an out-of-band authentication according to embodiments of the invention. For example, user 101 may initially be prompted to enter a password by the web page or mobile application user 101 is accessing with first user device 102. In addition to authenticating user 101 by the entered password, server computer 104 may generate and send a first signal to second user device 103 to initiate the out-of-band authentication. While this additional factor of authentication increases security, no extra user input is utilized beyond the password entered into first user device 102. In fact, authentication of user 101 may complete without user 101 having second user device 103 in immediate reach.

In some cases, first user device 102 and second user device 103 may be the same device. However, embodiments of the invention can still be implemented without increasing user input utilized for authentication.

Figure 2:
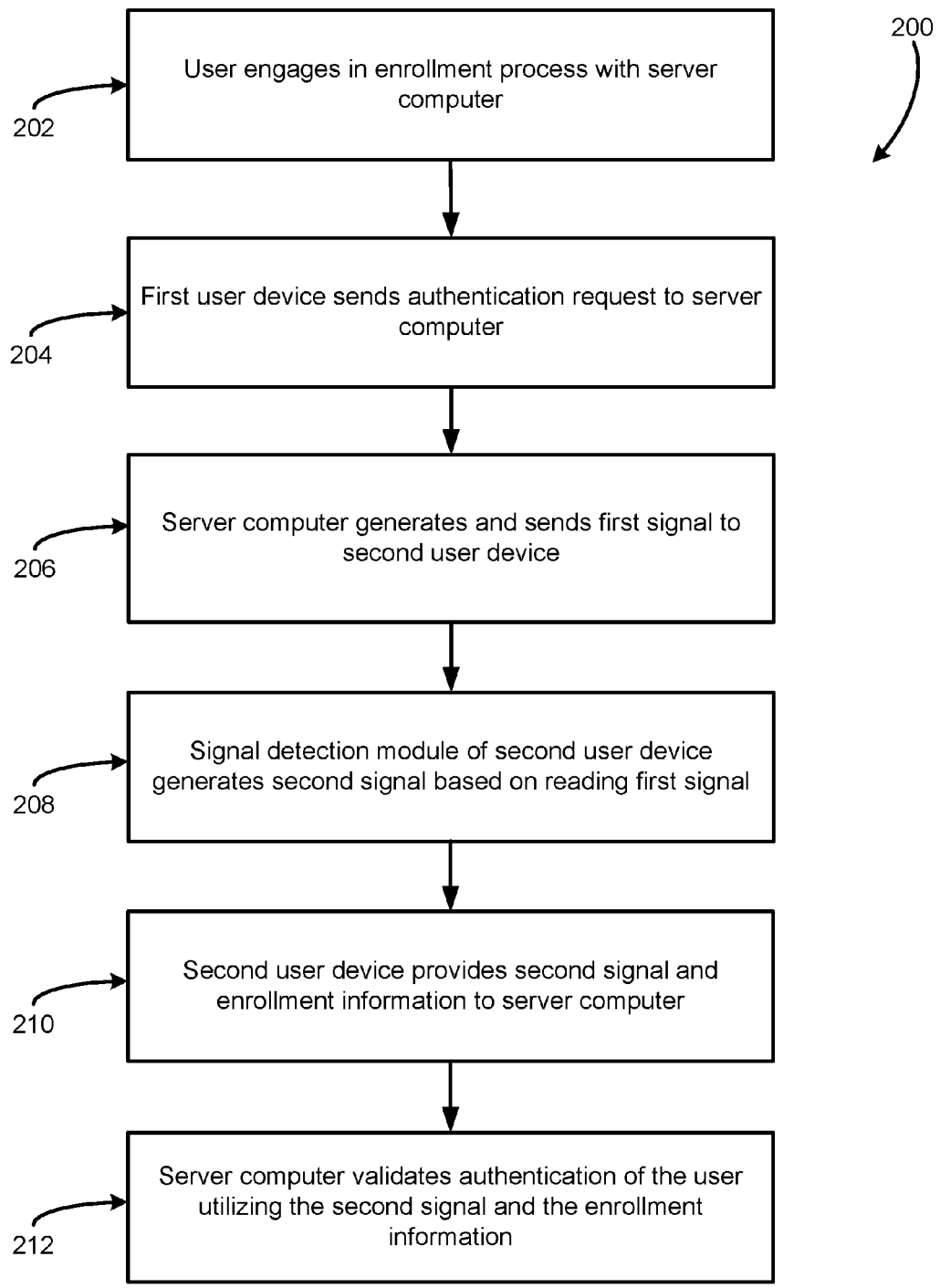
FIG. 2 shows a flowchart according to embodiments of the present invention.

A method according to the embodiments of the invention can be described with respect to FIG. 2. FIG. 2 shows a flowchart of a method for conducting an out-of-band authentication according to embodiments of the present invention utilizing enrollment information provided during an enrollment process. The order in which the operations are described is not intended to be construed as a limitation, and any number of the described operations can be omitted or combined in any order and/or in parallel to implement this process and any other processes described herein.

Some or all of the process 200 (or any other processes described herein, or variations and/or combinations thereof) may be performed under the control of one or more computer systems configured with executable instructions and may be implemented as code (e.g., executable instructions, one or more computer programs or one or more applications). In accordance with at least one embodiment, the process 200 of FIG. 2 (as well as other Figures in this application) may be performed by at least the one or more computer systems including first user device 102, second user device 103, server computer 104 in communication via communications network 114. The code may be stored on a computer-readable storage medium, for example, in the form of a computer program including a plurality of instructions executable by one or more processors. The computer-readable storage medium may be non-transitory.

The process 200 may include the user engaging in an enrollment process with the server computer at 202. The user may interact with the first user device and/or second user device to provide enrollment information to the server computer that can be utilized in a two-step authentication process. The user may provide enrollment information such as an identifier of an associated home area network, device information including a device ID for the first user device and second user device, biometrics (such as a fingerprint), passwords, GPS information, geo-fence information, or other suitable information that can be utilized to further verify and authenticate the user. The process 200 may include the first user device sending an authentication request to the server computer at 204. The authentication request may be provided in response to the user operating the first user device to access a website or mobile application operated by the server computer. The server computer may request authentication from the user before allowing the user access to a certain service. In some embodiments, the authentication request may be provided in response to the user operating the first user device to access a website or application operated by a merchant computer or server computer associated with a merchant as part of a transaction.

The process 200 may include the server computer generating and sending a first signal to a second user device associated with the user at 206. As described herein, components of the server computer (such as signal generation module 104(A)) may generate a first signal that is transmitted to the second user device to authenticate the user. The process 200 may include the second user device generating a second signal based on reading the first signal at 208. The second user device may generate the second signal based on the signal detection module 103(D). In some embodiments, the second user device may be configured to receive the first signal and transform the first signal into a function or action taken by the second user device that can be detected by the signal detection module 103(D) or other components of the second user device (103(B) or 103(C)) for use in generating the second signal.

The process 200 may include the second user device providing the second signal and enrollment information to the server computer for authentication of the user at 210. In some embodiments, the second user device may be configured to transmit the generated second signal, based on the received first signal, and enrollment information to the server computer for authentication of the user. In some embodiments, the enrollment information may be appended to the generated second signal before being transmitted. In other embodiments, the enrollment information may be provided separately from the second signal. For example, the second user device may provide the second signal and information identifying an available home area network being utilized to communicate said second signal. In some embodiments, the enrollment information may be obtained by the server computer without any further communication or special instruction from the second user device. For example, the server computer may be configured to obtain the device identifier associated with the second user device through receiving and processing the second signal transmitted by the second user device. In some embodiments, the server computer may be configured to request enrollment information or additional information from the user via the first user device and/or second user device, such as passwords or a biometric, upon receiving the second signal.

The process 200 may conclude at 212 by validating the authentication of the user utilizing the second signal and the enrollment information. As described herein, the server computer may compare the first signal and the received second signal to authenticate the user. In some embodiments, the server computer may compare the received enrollment information to the enrollment information provided by the user during the enrollment process. In such embodiments, the server computer may authenticate the user utilizing the comparison of the first signal to the second signal and the comparison of the received enrollment information and the previously provided enrollment information associated with the user. For example, the server computer may deny authentication of the user if the received enrollment information identifies a different home area network utilized to communicate the second signal from the home area network information associated with the user during the enrollment process. In some embodiments, the server computer may maintain one or more thresholds associated with the comparison of the first signal and second signal to determine the authentication of the user. For example, certain users may only be authenticated based on the comparison of the first signal and second signal exceeding a certain threshold (e.g., accuracy of 90% or more) by the server computer.

Figure 3:
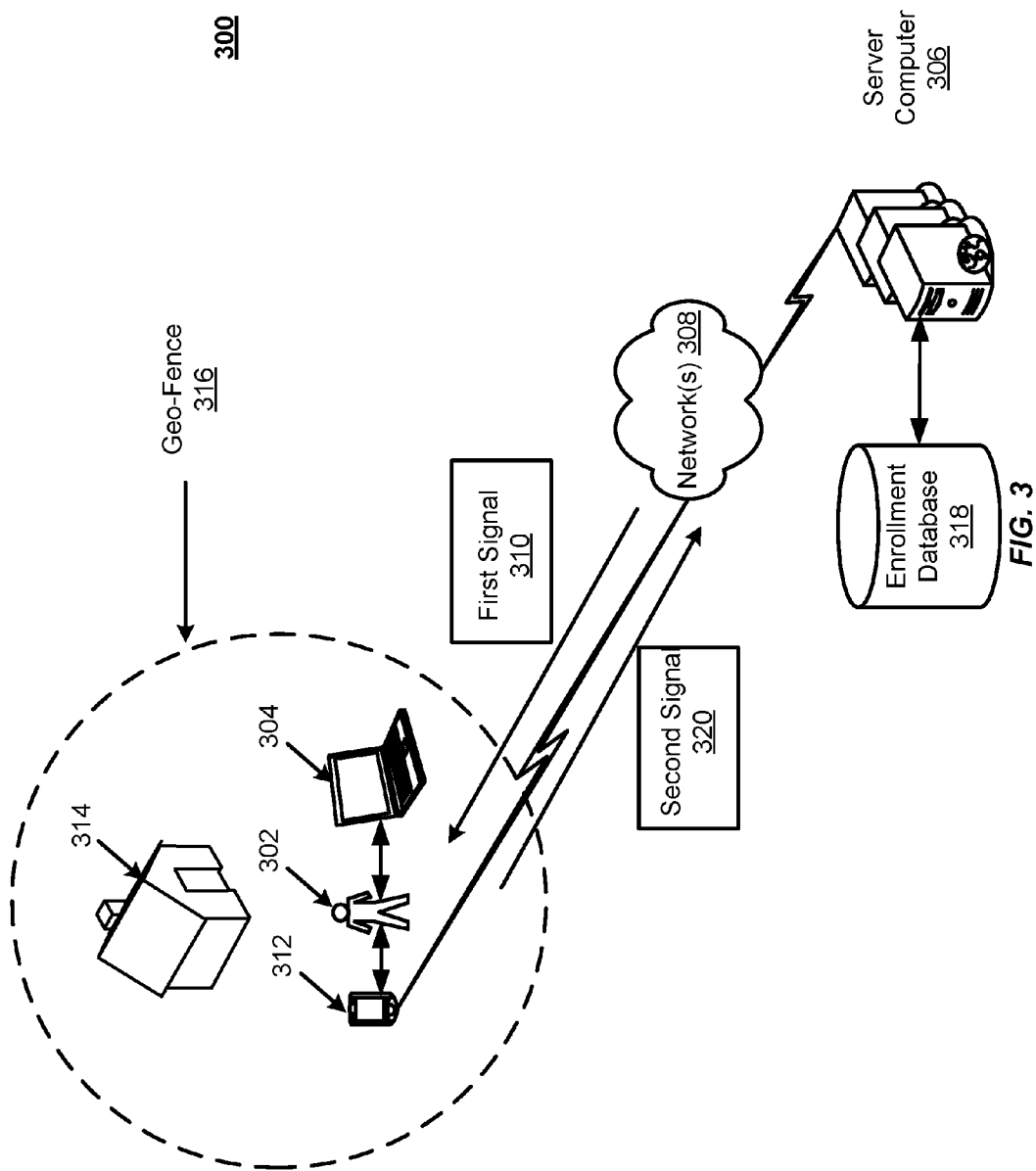
FIG. 3 shows a work flow for authenticating a user according to embodiments of the present invention.

FIG. 3 shows a work flow for authenticating a user according to embodiments of the present invention. The workflow 300 may include a user 302 interacting with a first user device 304 to request access to a website operated by server computer 306 via networks 308. In some embodiments, the server computer 306 may require the user 302 be authenticated before access is granted. The server computer 306 may transmit, via networks 308, a first signal 310 to a second user device 312 associated with the user. Previously, the user 302 may have performed, via the first user device 304, an enrollment process with the server computer 306 to provide various enrollment information. For example, the user 302 may have provided GPS information, home area network information located around the user's 302 home 314, or other information identifying a geo-fence 316 that is associated around the home 314 for authentication purposes. In some embodiments, the server computer 306 may maintain and update enrollment information for one or more users (such as user 302) in an enrollment database 318.

In embodiments, the second user device 312 may generate a second signal 320 based on reading the first signal 310 from the server computer 306. The second user device may generate the second signal 320 and provide it, via networks 308, to server computer 306 to authenticate the user 302. In some embodiments, the server computer 306 may compare the first signal 310 to the received second signal 320 to authenticate the user. In embodiments, the server computer 306 may obtain enrollment information appended or associated with the second signal 320 for comparison to the enrollment information maintained, on behalf of the user, in enrollment database 318 for authenticating the user. The server computer 306 may utilize the comparison of the first signal 310 to second signal 320 and received enrollment information to previously stored enrollment information to authenticate the user in a two-step authentication process. Referring to FIG. 3, had the second signal 320 been generated by the second user device 312 outside of geo-fence 316, the server computer 306 may have denied authenticating the user 302 as the enrollment information (geo-fence 316) provided during the enrollment process was different from the recently received enrollment information (second user device 312 generating and providing second signal 320 outside of geo-fence 316). Other combinations of enrollment information comparisons (e.g., comparison of GPS locations, home area networks, device IDs, etc.,) may also be implemented in two-step authentication processes described herein.

Figure 4:
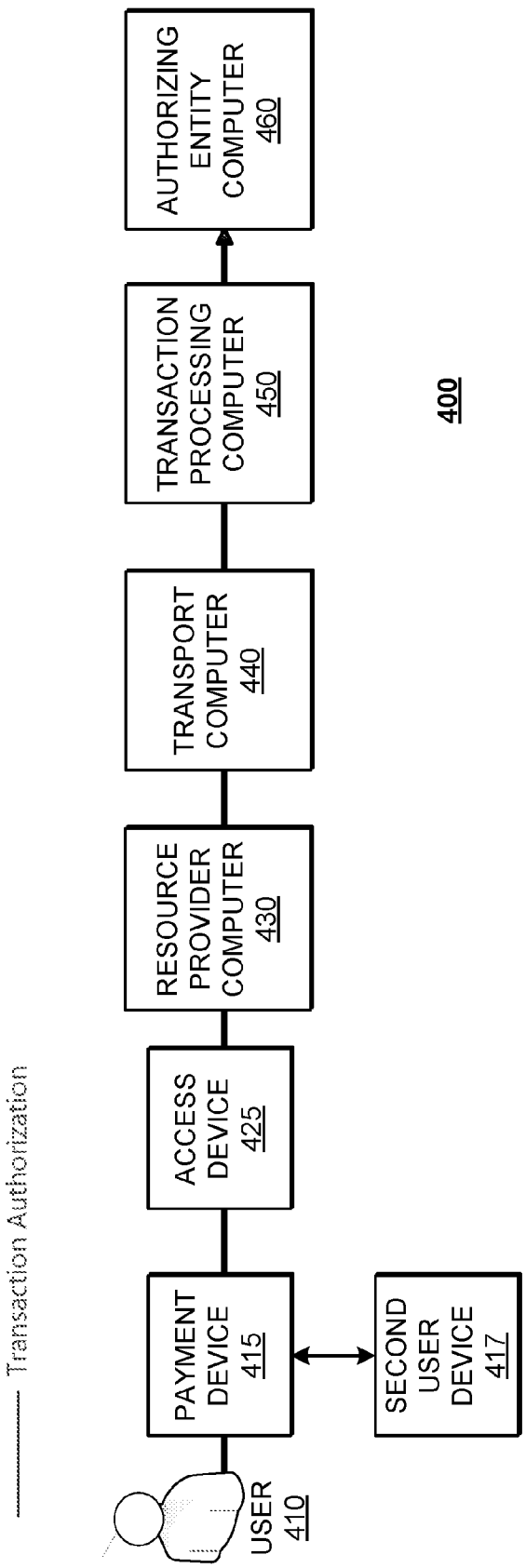
FIG. 4 shows a block diagram of a system for authenticating transactions, according to embodiments of the present invention.

FIG. 4 shows a system 400 comprising a number of components. The system 400 comprises a payment device 415 and a second user device 417 which may be associated with a user 410 and may be able to provide payment credentials to an access device 425. The access device 425 may be considered analogous to the first user device described above. The access device 425 may be associated and in communication with a resource provider computer 430. The access device 425 and payment device 415 may be utilized in the authentication process described herein. For example, the user 410 may utilize the payment device 415 to interact with an access device 425 that is associated with a resource provider computer 430 that further operates a website to initiate authorization. Further, the resource provider computer 430, a transport computer 440, a transaction processing computer 450, and an issuer computer 460 may all be in operative communication with each other through any suitable communication channel or communications network. Suitable communications networks may be any one and/or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a Wireless Application Protocol (WAP), I-mode, and/or the like); and/or the like.

Messages between the computers, networks, and devices may be transmitted using a secure communications protocols such as, but not limited to, File Transfer Protocol (FTP); HyperText Transfer Protocol (HTTP); Secure Hypertext Transfer Protocol (HTTPS), Secure Socket Layer (SSL), ISO (e.g., ISO 8583) and/or the like.

The user 410 may be able to use the payment device 415 to conduct transactions with a resource provider associated with the resource provider computer 430. The payment device 415 may store information associated with the user 410 and/or a payment account. For example, the payment device 415 may store payment credentials as well as personal information such as a name, address, email address, phone number, or any other suitable user 410 identification information. The payment device 415 may provide this information to the access device 425 during a transaction.

The resource provider computer 430 may be associated with a resource provider. The resource provider may engage in transactions, sell goods or services, or provide access to goods or services to the user 410. The resource provider may accept multiple forms of payment (e.g. the payment device 415) and may use multiple tools to conduct different types of transactions. For example, the resource provider may operate a physical store and use the access device 425 for in-person transactions. The resource provider may also sell goods and/or services via a website, and may accept payments over the Internet. In some embodiments, the resource provider computer 430 may also be able to request payment tokens associated with the user's payment credentials. In embodiments, the user 410 may require authorization before a transaction can be completed. The resource provider computer 430 may implement the authorization embodiments described herein or may communicate with one or more other computers such as authorizing entity computer 460 to authorize the user.

Authorization requests submitted by the resource provider computer 430 or the access device 425 may be sent to the transport computer 440 (which may be an acquirer computer). The transport computer 440 may be associated with the resource provider computer 430, and may manage authorization requests on behalf of the resource provider computer 430. The transport computer 440 may also handle token request messages on behalf of the resource provider computer 430. For example, in some embodiments, the transport computer 440 may receive and forward token request messages in the same manner as authorization request messages.

As shown in FIG. 4, the transaction processing computer 450 may be disposed between the transport computer 440 and the authorizing entity computer 460. The transaction processing computer 450 may include data processing subsystems, networks, and operations used to support and deliver authorization services, exception file services, and clearing and settlement services. For example, the transaction processing computer 450 may comprise a server coupled to a network interface (e.g., by an external communication interface), and databases of information. The transaction processing computer 450 may be representative of a transaction processing network. An exemplary transaction processing network may include VisaNet™. Transaction processing networks such as VisaNet™ are able to process credit card transactions, debit card transactions, and other types of commercial transactions. VisaNet™, in particular, includes a VIP system (Visa Integrated Payments system) which processes authorization requests and a Base II system which performs clearing and settlement services. The transaction processing computer 450 may use any suitable wired or wireless network, including the Internet.

The authorizing entity computer 460 may issue and manage a payment account and an associated payment device 415 of the user 410. The authorizing entity computer 460 may be able authorize transactions that involve the payment account. Before authorizing a transaction, the authorizing entity computer 460 may authenticate payment credentials received in the authorization request, and check that there is available credit or funds in an associated payment account. The authorizing entity computer 460 may also receive and/or determine a risk level associated with the transaction, and may weigh the risk when deciding whether or not to authorize the transaction. If the authorizing entity computer 460 receives an authorization request that includes a payment token, the authorizing entity computer 460 may be able to de-tokenize the payment token in order to obtain the associated payment credentials.

In embodiments, the authorizing entity computer 460 may generate and provide the first signal to a second user device 417 associated with the user 410 as part of the authorization process described herein. The authorizing entity computer 460 may receive a second signal from the second user device to authenticate the user 410 according to embodiments described herein. The authorizing entity computer 460 may be in communication with an enrollment database (not pictured) as part of a two-step authentication process. For example, the authorizing entity computer 460 may communicate with the enrollment database to compare device and/or location information received from the second user device to enrollment information previously provided by the user 410 as part of the two-step authentication that includes the second signal. Using this authentication process, the authorizing entity computer 460 may determine that the user 410 is authentic and may use this information in deciding whether or not to authorize the transaction. Note that in other embodiments of the invention, the transaction processing computer 450, the transport computer 440, or the resource provider computer 430 may transmit the first signal to the second user device 417 and may receive the second signal from the second user device 417 to authenticate the user 410.

As described herein, a computer system that may be used to implement any of the entities or components described above. The subsystems of a computer system may be interconnected via a system bus. Additional subsystems such as a printer, keyboard, fixed disk (or other memory comprising computer readable media), monitor, which is coupled to display adapter, and others are also included in embodiments described herein. Peripherals and input/output (I/O) devices, which may be coupled to an I/O controller (which can be a processor or other suitable controller), can be connected to the computer system by any number of means known in the art, such as a serial port. For example, a serial port or external interface can be used to connect the computer apparatus to a wide area network such as the Internet, a mouse input device, or a scanner. The interconnection via system bus allows the central processor to communicate with each subsystem and to control the execution of instructions from system memory or the fixed disk, as well as the exchange of information between subsystems. The system memory and/or the fixed disk of the computer system may embody a computer readable medium. In some embodiments, the monitor may be a touch sensitive display screen.

A computer system can include a plurality of the same components or subsystems, e.g., connected together by an external interface or by an internal interface. In some embodiments, computer systems, subsystem, or apparatuses can communicate over a network. In such instances, one computer can be considered a client and another computer a server, where each can be part of a same computer system. A client and a server can each include multiple systems, subsystems, or components.

It should be understood that any of the embodiments of the present invention can be implemented in the form of control logic using hardware (e.g. an application specific integrated circuit or field programmable gate array) and/or using computer software with a generally programmable processor in a modular or integrated manner. As used herein, a processor includes a single-core processor, multi-core processor on a same integrated chip, or multiple processing units on a single circuit board or networked. Based on the disclosure and teachings provided herein, a person of ordinary skill in the art will know and appreciate other ways and/or methods to implement embodiments of the present invention using hardware and a combination of hardware and software.

Any of the software components or functions described in this application may be implemented as software code to be executed by a processor using any suitable computer language such as, for example, Java, C, C++, C#, Objective-C, Swift, or scripting language such as Perl or Python using, for example, conventional or object-oriented techniques. The software code may be stored as a series of instructions or commands on a computer readable medium for storage and/or transmission, suitable media include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

Such programs may also be encoded and transmitted using carrier signals adapted for transmission via wired, optical, and/or wireless networks conforming to a variety of protocols, including the Internet. As such, a computer readable medium according to an embodiment of the present invention may be created using a data signal encoded with such programs. Computer readable media encoded with the program code may be packaged with a compatible device or provided separately from other devices (e.g., via Internet download). Any such computer readable medium may reside on or within a single computer product (e.g. a hard drive, a CD, or an entire computer system), and may be present on or within different computer products within a system or network. A computer system may include a monitor, printer, or other suitable display for providing any of the results mentioned herein to a user.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

One or more features from any embodiment may be combined with one or more features of any other embodiment without departing from the scope of the invention.

A recitation of "a", "an" or "the" is intended to mean "one or more" unless specifically indicated to the contrary.

All patents, patent applications, publications, and descriptions mentioned above are herein incorporated by reference in their entirety for all purposes. None is admitted to be prior art.

What is claimed:

1. A method comprising:
receiving, by a server computer, an authentication request from a first user device associated with a user;
transmitting, by the server computer, a first signal to a second user device associated with the user, the first signal comprising data representing a vibration pattern;
receiving, by the server computer, a second signal from the second user device that comprises the data representing the vibration pattern, wherein the second signal is generated using a motor based on the second user device detecting the first signal by one or more of an accelerometer associated with the second user device and a microphone associated with the second user device;
determining, by the server computer, that the second signal is valid based on the transmitted first signal; and
authenticating, by the server computer, the user based on the determination that the second signal is valid.

2. The method of claim 1, further comprising:
transmitting, by the server computer, a request for a password to the first user device associated with the user; and
receiving, by the server computer, input from the first user device that includes the requested password.

3. The method of claim 2, wherein authenticating the user is further based on the input from the first user device.

4. The method of claim 1, further comprising maintaining, by the server computer, enrollment information identifying the second user device associated with the user for use in authenticating the user.

5. The method of claim 4, wherein authenticating the user is further based on validating the second user device utilizing the enrollment information.

6. The method of claim 1, further comprising further comprising maintaining, by the server computer, network information identifying a home area network associated with the user for use in authenticating the user.

7. The method of claim 6, wherein the second signal is generated further based on the second user device reading the first signal and identifying that the second user device is connected to the home area network associated with the user.

8. The method of claim 6, further comprising appending an identifier for the home area network to the second signal after generation of the second signal by the second user device.

9. The method of claim 8, wherein authenticating the user is further based on the identifier for the home area network and the network information associated with the user.

10. The method of claim 1, further comprising maintaining geo-fence information associated with the user.

11. The method of claim 10, wherein the second signal is generated further based on the second user device reading the first signal and identifying that a location of the second user device is within a geo-fence identified by the geo-fence information associated with the user.

12. The method of claim 10, wherein authenticating the user is further based on the geo-fence information associated with the user.

13. The method of claim 1, further comprising maintaining threshold information that identifies a certain threshold associated with authenticating the user utilizing the second signal.

14. The method of claim 13, wherein authenticating the user is further based on a comparison of the first signal and the second signal exceeding a particular threshold identified by the threshold information.

15. A server computer comprising:
a processor; and a memory element including instructions that, when executed with the processor, cause the system to, at least:
  receive an authentication request from a first user device associated with a user;
  transmit a first signal to a second user device associated with the user, the first signal comprising data representing a vibration pattern;
  receive a second signal from the second user device that comprises the data representing the vibration pattern, wherein the second signal is generated sing a motor based on the second user device detecting the first signal by one or more of an accelerometer associated with the second user device and a microphone associated with the second user device;
  determine that the second signal is valid based on the transmitted first signal; and
  authenticate the user based on the determination that the second signal is valid.

16. The server of claim 15, wherein the first signal is an audio signal.

17. A user device comprising:
a processor; and
a memory element including instructions that, when executed with the processor, cause the user device to, at least:
  receive, from a server computer, a first signal based on an authentication request associated with a user, the first signal comprising data representing a vibration pattern;
  generate, using a motor associated with the user device, a second signal that comprises the data representing the vibration pattern based on detecting the first signal by one or more of an accelerometer associated with the user device and a microphone associated with the user device;
  transmit, to the server computer, the second signal, wherein the user is authenticated based on validating the second signal, the second signal validated using the first signal.

* * * * *